Feb. 23, 1971 G. W. BERTHOLD 3,564,854
SEPTIC TANK SYSTEM

Filed May 13, 1969 2 Sheets-Sheet 1

George W. Berthold
INVENTOR.

BY *Clarence A. O'Brien*
and *Harvey B. Jackson*
Attorneys

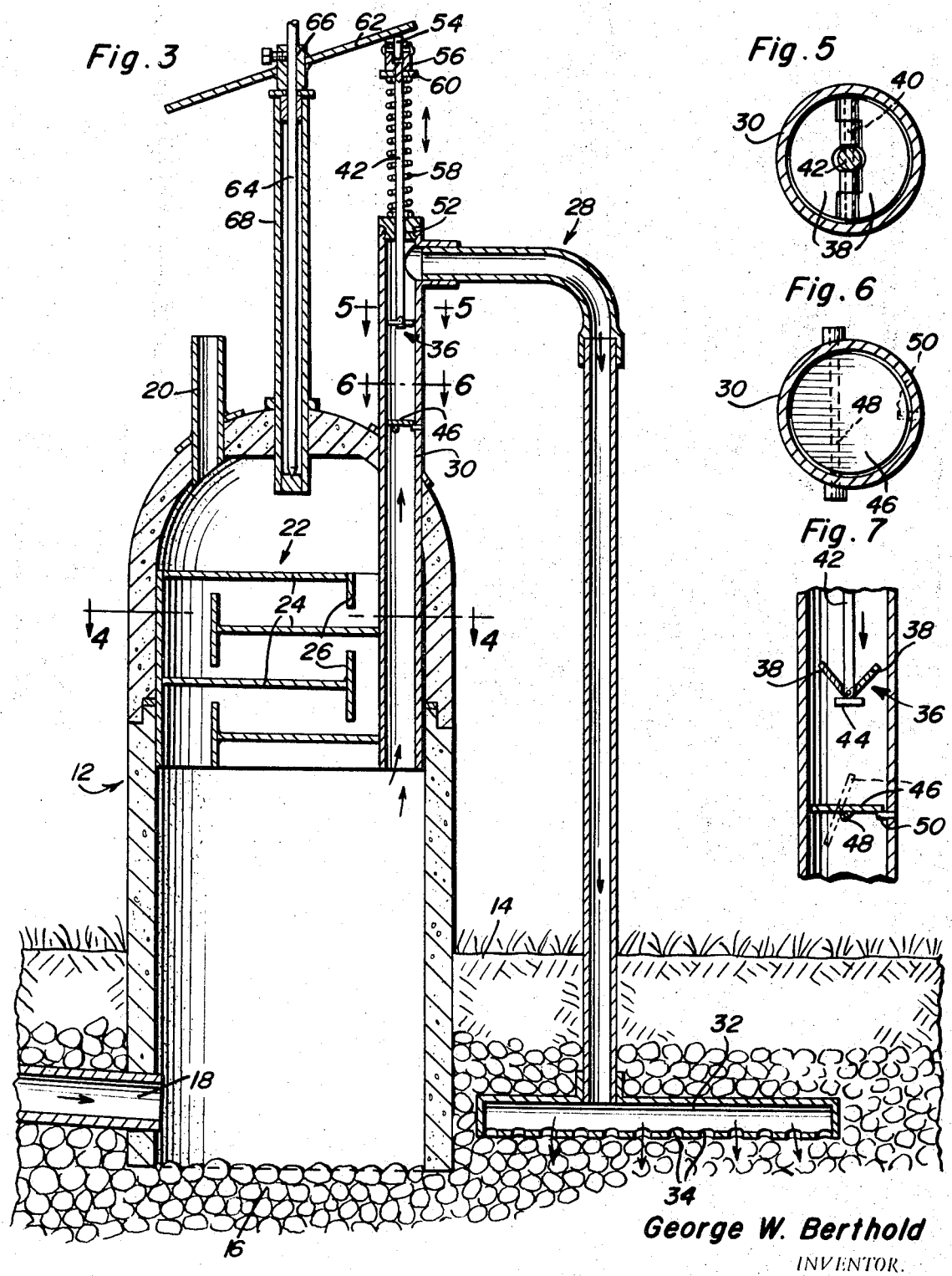

United States Patent Office 3,564,854
Patented Feb. 23, 1971

3,564,854
SEPTIC TANK SYSTEM
George W. Berthold, 513 Giuffrias Ave.,
New Orleans, La. 70001
Filed May 13, 1969, Ser. No. 824,107
Int. Cl. E02b 13/00; F24f 7/04
U.S. Cl. 61—13       20 Claims

ABSTRACT OF THE DISCLOSURE

A septic tank system including an upright partially embedded septic tank having an air intake vent communicating with the upper interior of the tank for the introduction of fresh air thereinto, and an air discharge line spaced from the air vent and extending from the above ground portion of the tank to a drain field whereby a flow of air through the tank is possible so as to assist in the decomposition of the sewage. A baffle system is internally located within the tank so as to prevent a backflow of air through the vent and an air pump unit is associated with the discharge line so as to provide for a forced flow of air.

---

The instant invention is generally concerned with a septic tank system, and more particularly relates to a system wherein specific provision is made so as to insure a substantially constant flow of fresh air through the tank so as to aid in decomposition of the sewage and remove noxious gases which might develop therein.

Several objects are associated with the instant invention, including the provision of a sewage disposal system which is compact, highly efficient in effecting its intended purpose, free of noxious odors, and incorporates power means in aiding in the operation of the decomposition of sewage, such power means, in one form, being wind power.

The objects of the instant invention are achieved through the provision of an upright septic tank having the lower portion thereof embedded within the ground in direct communication with a drainage bed. An air intake vent is communicated with the upper end of the tank above ground level. A tortuous air path defining series of baffles is located within the tank immediately below the air vent, and an elongated air discharge line is communicated with the tank above ground level and below the baffle arrangement. The air discharge line communicates with the drainage bed laterally of the septic tank and includes an air or gas distributing elongated perforated tube. Further, an air pump is associated with the air discharge line for effecting a forced movement of air through the tank from the vent to and through the discharge line. The air pump will normally be controlled by a power driven reciprocating piston, the associated rod of which engages a rotating wobble plate. The driving of the wobble plate can either be effected through a tank mounted motor or by means of a wind vane.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged cross-sectional view taken substantially on a plane passing along line 3—3 in FIG. 2;

FIG. 5 is an enlarged cross-sectional detail of the piston taken substantially on a plane passing along line 5—5 in FIG. 3;

FIG. 6 is an enlarged cross-sectional detail taken substantially on a plane passing along line 6—6 in FIG. 3;

FIG. 7 is a cross-sectional detail illustrating the operation of the folding piston and the associated baffle, both located within the air discharge line.

Figure 1:
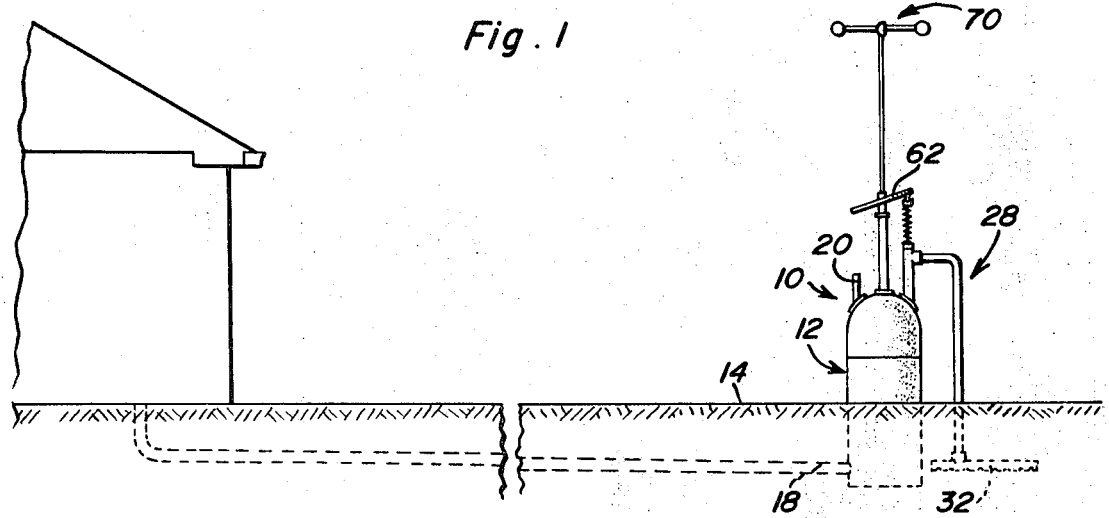
FIG. 1 is an elevational view of the septic tank system of the instant invention.
Figure 2:
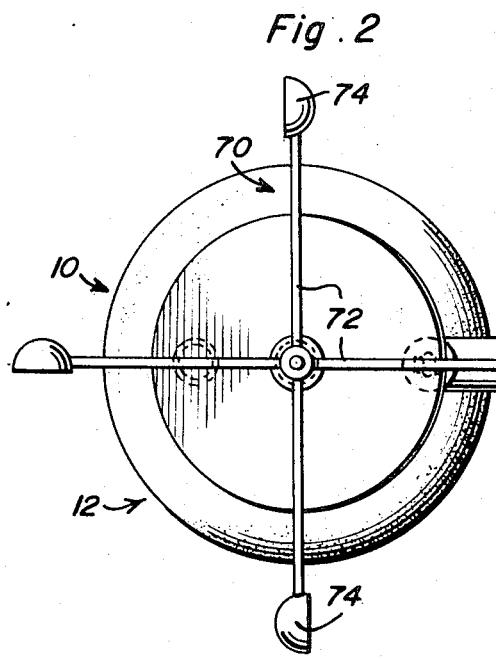
FIG. 2 is a top plan view of the septic tank and the associated apparatus.

Referring now more specifically to the drawings, reference numeral 10 is used to generally designate the septic tank sewage system comprising the instant invention. This system includes an enlarged vertically orientated septic tank 12 preferably, although not necessarily, formed of concrete. As will be best appreciated from FIG. 3, the tank, if formed of concrete, can be sectional in nature for ease of assembly.

The tank 12 is to be partially embedded in the ground, projecting a substantial distance both above and below ground level 14. The lower end of the tank is open and embedded within a drainage bed 16 formed of shells, gravel, or the like. The sewer line 18 will be communicated with the lower portion of the septic tank 12 below ground level 14.

Figure 4:
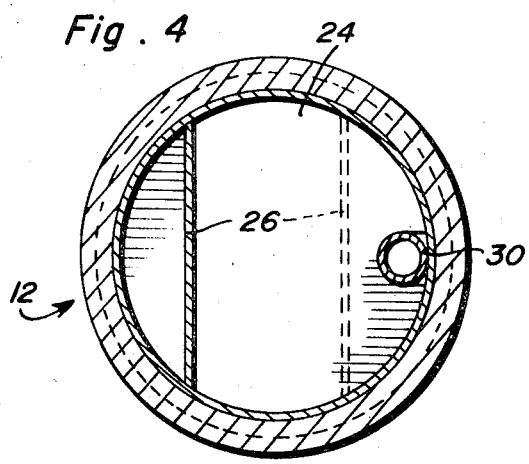
FIG. 4 is a transverse cross-sectional view taken substantially on a plane passing along line 4—4 in FIG. 3.

An air vent 20 will be provided through the normally dome-shaped upper portion of the tank 12, such vent being in the nature of a pipe engaged through and affixed to the tank shell. In spaced relation below the vent 20, and still in the upper portion of the tank 12, a relatively substantial distance above ground level 14, is a baffle unit 22. This baffle unit 22 consists of a series of horizontal baffle plates or panels 24 alternately extending from diametrically opposed points on the tank wall and overlapping each other for a substantial distance. The panels 24 are in vertically spaced relation to each other and provided, at the inner ends thereof, with flow deflecting perpendicularly directed flanges 26. With reference to FIG. 4, it will be appreciated that these baffle plates or panels 24 completely span the septic tank 12 from the secured edge thereof to the edge upon which the flange or flanges 26 are provided. In this manner, movement of the air to the lower portion of the septic tank at 12 from the fresh air vent 20 is only possible by a traveling of the air along a tortuous or sinuous path through the baffle unit, between the vertically spaced plates and about the vertically directed flanges.

An elongated air discharge line 28 extends from communication with the septic tank below the baffle unit to the drainage or gravel bed 16 at a point laterally spaced from the septic tank 12. This air discharge line 28 includes a first vertical length 30 affixed to the septic tank 12 and extending from a point in communication with the tank 12 immediately below the baffle unit 22 to a point vertically above the top of the tank 12. The remainder of the air discharge line 28 communicates with the first length 30 adjacent the upper end thereof and extends outwardly from the tank 12 and then vertically downward into the drainage bed. Once within the drainage bed, the outer end of the air discharge line is communicated with a transversely elongated perforated discharge pipe 32, the perforations or holes 34 therein preferably being downwardly directed whereby the fluid or airflow through the air discharge line is discharged directly into the drainage bed over an elongated portion thereof. Thus, a baffled air path is provided through the septic tank from the air vent 20 to the drainage bed 16 laterally spaced from the tank 12.

It is contemplated that power means be utilized so as to effect a forced movement of air through the tank and hence obtain the benefits to be derived therefrom with regard to both aiding in a decomposition of the sewage and avoiding any undesirable buildup of noxious gases or the like. The forced movement of air is effected utilizing a vertically reciprocating piston 36 slidably received within the upper portion of the vertical length 30 of the air discharge line 28. This piston, noting the details of FIGS. 5 and 7 in particular, consists of a pair of opposed semi-circular leaves 38 each pivotally or hingedly mounted to a transverse pivot pin 40 which in turn is centrally affixed to the lower end of a piston rod 42. A transverse head or stop 44 is also mounted on the pivot pin 40 immediately therebelow, the stop 44 projecting laterally outward beneath both of the piston leaves 38 whereby a retention of these leaves 38 horizontally so as to substantially completely fill the line will be effected both when the piston 36 is at rest and when an upward movement thereof is being effected through a corresponding upward movement of the piston rod 42. By the same token, upon a downward movement of the piston 36, through a corresponding downward push on or movement of the piston rod 42, the leaves 38 will tend to pivot or swing upwardly as illustrated in FIG. 7. Thus, upon an upward stroke of the piston 36, air thereabove is forced upwardly along the length of the air discharge line. By the same token, upon a downward stroke of the piston 36, the piston 36 tends to move freely with little or no corresponding downward movement of the air therebeneath.

In order to further insure the effectiveness of the air moving apparatus in moving the air upwardly along the line length 30 out of the septic tank 12, and not downwardly therethrough into the tank 12 a baffle plate 46 is also provided in the line length 30 below the lower limit of movement of the piston 36. This baffle plate 46, when horizontally disposed, substantially completely closes the line length 30. By the same token, when open, a substantially complete opening of the line length 30 is effected. The plate 46 itself is pivotally mounted by a transverse rotatably mounted pivot pin 48. This pivot pin 48, as will be appreciated from the drawings, is offset to one side of the diametric center of the baffle plate 46, this providing for an automatic swinging of the baffle plate to its horizontal line closing position, an appropriate stop 50 being utilized so as to define the horizontal position of the plate 48. Thus, in the operation of the air pumping apparatus, upon an upward stroke of the piston 36, an upward drawing of the air thereby will be effected which in turn will result in an upward open swinging of the baffle plate 48 so as to enable a movement of the air from the septic tank 12 thereby. By the same token, a downward stroke of the piston 36 will result in an immediate closing of the baffle plate 46 and a corresponding opening or upward swinging of the piston leaves 38, thus precluding a downward driving of air from the air discharge line back into the septic tank 12.

The piston rod 42 extends slidably through a removable end plug 52 provided on the extreme upper end of the line length 30 and for a substantial distance thereabove, terminating in an upwardly directed roller 54 journaled in and rotatably mounted by an appropriate mounting block 56. An expanded coiled compression spring 58 is engaged between the undersurface of the wheel mounting block 56, or an enlarged washer 60 engaged thereagainst, and the line cap 52 whereby a continuous upward biasing on the rod 42, and hence the piston 36, is effected. The vertical reciprocation of the piston rod 42 is to be effected in response to an angularly orientated circular wobble plate 62 engaged over and in rotating contact with the rod mounted roller 54. The wobble plate 62 is mounted for rotation by a vertical shaft or rod 64 projecting upwardly from the top of the tank 12 in laterally spaced relation to the piston rod 42. The wobble plate 62 can be fixed to the shaft 64 by means of an appropriate hub unit 66 with the shaft 64 itself rotatably mounted within a vertically elongated tank mounted tube or sleeve 68, as will be best appreciated from FIG. 3. The actual driving of the shaft 64, and hence the wobble plate 62, will be effected by a wind vane 70 affixed to the extreme upper end of the shaft 64 vertically above the wobble plate 62. This wind vane will normally consist of a plurality of radiating arms 72, each mounting a wind catching means, for example a cup 74, on the outer end thereof. Thus, assuming a sufficient wind so as to activate the wind vane 70, the shaft 64 will be driven, resulting in a rotation of the angularly orientated wobble plate 62 which, as it rides over the piston mounted roller 54, will, in conjunction with the compression spring 58, produce a vertical reciprocation of the air moving piston 36. It will be appreciated that the spring 58, which is primarily a return spring, also will act to cushion the downward movement of the piston rod 42 and piston 36 to prevent damage thereto under high wind conditions.

Figure 8:
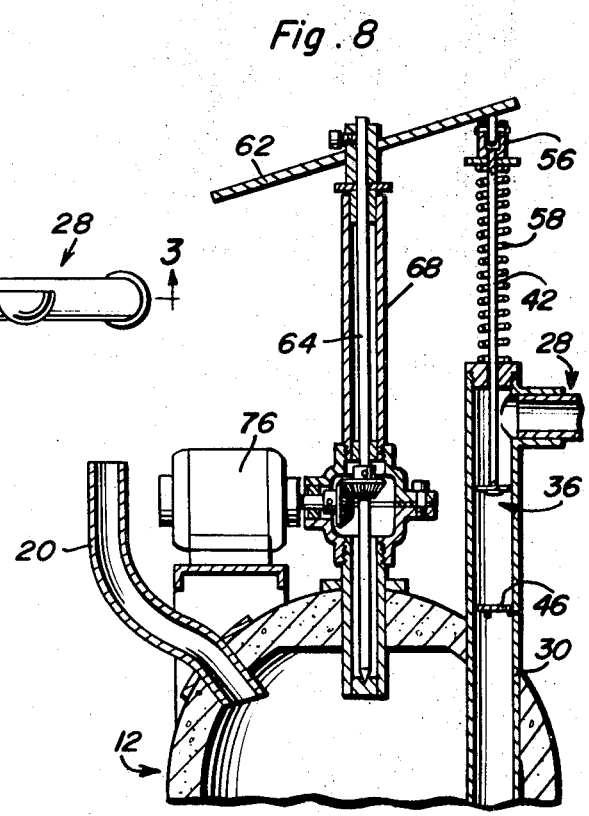
FIG. 8 is a cross-sectional view of the upper portion of the tank illustrating a modified form of power means for effecting the desired airflow.

While it is contemplated that the wind powered unit will provide for an ample movement of fresh air through the tank 12 and a removal of the noxious gas buildup therefrom, should it be desirable to effect a more positive continuous flow of air, notwithstanding external wind conditions, a power motor, normally an electric motor 76, can be mounted on the upper end of the tank 12 and gear meshed with the wobble plate shaft 64, as illustrated in FIG. 8, so as to effect a driving thereof. In this instance it will of course be appreciated that the shaft 64 itself will terminate at or just above the wobble plate 62. Further, in order to accommodate the motor 76, a slight variation in the orientation of the air intake vent pipe 20 may be necessary.

From the foregoing, it will be appreciated that a highly unique septic tank system has been devised. This system incorporates specific means for the provision of a forced flow of fresh air into and through the septic tank with the flow of air both aiding in the decomposition of the sewage and in the removal of noxious gases from the tank for discharge into the drainage bed laterally of the septic tank itself. The baffle unit provided internally within the tank 12, which incidently can be mounted in any suitable manner, such as through the provision of a metal sleeve bolted or otherwise affixed internally to the shell of the tank 12, provides a tortuous path to movement of the air between the lower sewage receiving portion of the tank 12 and the upper pure air vent. This tortuous path, while having little effect on the power drawing of the air through the tank 12, tends to effectively block any movement of the air back upwardly through the tank itself to the air intake vent 20 such as might tend to occur during periods when the power air means is not in operation. The actual pumping of the air is effected through a vertically reciprocating folding piston operatively driven by a revolving wobble plate and a reaction spring.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A septic tank system comprising a septic tank, a sewage discharge line in communication with the tank for the introduction of sewage thereinto, a subsurface drainage bed, a fresh air vent extending into said septic tank, an air discharge line communicated with said septic tank remote from said vent and extending from said septic tank to the drainage bed at a point remote from the tank for enabling flow of air from said air vent, through said septic tank and through the air discharge line into the drainage bed.

2. The system of claim 1 including power means for drawing air into said septic tank through the air vent and discharging the air into said drainage bed through the air discharge line.

3. The system of claim 2 including baffle means therein for inhibiting a return flow of air from the septic tank back through the air vent.

4. The system of claim 3 wherein said baffle means defines a tortuous path inward of the air vent within the septic tank.

5. The system of claim 4 wherein said septic tank is partially embedded in the ground, the lower end of said septic tank being open and seating directly in the drainage bed.

6. The system of claim 5 wherein an air path through said septic tank from the air vent through the baffle means and into the air discharge line is located above ground level.

7. The system of claim 6 wherein said power means comprises a reciprocating piston within said air discharge line, drive mean for reciprocating said piston, and means associated with said piston for effecting a controlled movement of air by said piston whereby a movement of air from the discharge line back into the septic tank is precluded.

8. The system of claim 7 including a piston rod on and extending from said piston, said last mentioned means including means pivotally mounting said piston on the piston rod for movement between a line blocking and air moving position upon a movement of the piston along the line in a direction from the septic tank to the drainage bed, and a line opening position upon a movement of the piston along the line in a direction from the drainage bed to the septic tank.

9. The system of claim 8 wherein the means associated with the piston for effecting a controlled movement of the air further includes a baffle plate mounted toward the septic tank end of the air discharge line, said baffle plate automatically moving between an air passing position upon a movement of the piston along the line toward the drainage bed, and an air blocking position upon a movement of the piston along the line toward the septic tank.

10. The system of claim 9 wherein the drive means for reciprocating said piston comprises a wobble plate engaged with the end of the piston rod remote from the piston, and means for rotatably driving said wobble plate while maintaining a continuous engagement between the wobble plate and the piston rod end.

11. The system of claim 10 wherein the means for driving the wobble plate comprises a rotatable rod support mounting said wobble plate, and a wind responsive vane mounted on said rod for a rotational driving thereof.

12. The system of claim 11 including a spring on said piston rod reacting thereagainst so as to move the corresponding end of the piston rod continuously against the wobble plate.

13. The system of claim 12 wherein said air discharge line includes a vertical length within which said piston operates and beyond which the piston rod extends, the spring, wobble plate and wobble plate mounting and rotating apparatus being mounted exterior of said vertical length of the discharge line.

14. The system of claim 13 including an elongated perforated diffusing pipe mounted on the lower end of said air discharge line within the drainage bed.

15. The system of claim 2 wherein said septic tank is partially embedded in the ground, the lower end of said septic tank being open and seating directly in the drainage bed.

16. The system of claim 15 wherein an air path through said septic tank from the air vent through the baffle means and into the air discharge line is located above ground level.

17. The system of claim 7 wherein the means associated with the piston for effecting a controlled movement of the air includes a baffle plate mounted toward the septic tank end of the air discharge line, said baffle plate automatically moving between an air passing position upon a movement of the piston along the line toward the drainage bed, and an air blocking position upon a movement of the piston along the line toward the septic tank.

18. The system of claim 2 wherein said power means comprises a reciprocating piston within said air discharge line, drive means for reciprocating said piston, and means associated with said piston for effecting a controlled movement of air by said piston whereby a movement of air from the discharge line back into the septic tank is precluded.

19. The system of claim 18 including a piston rod on and extending from said piston, the drive means for reciprocating said piston comprising a wobble plate engaged with the end of the piston rod remote from the piston, and means for rotatably driving said wobble plate while maintaining a continuous engagement between the wobble plate and the piston rod end.

20. The system of claim 3 wherein an air path through said septic tank from the air vent through the baffle means and into the air discharge line is located above ground level, whereby a flow path is insured regardless of the height of the ground water level.

References Cited

UNITED STATES PATENTS

| | | | |
|---|---|---|---|
| 933,121 | 9/1909 | Schofield | 61—13X |
| 1,981,051 | 11/1934 | Leeuw | 98—33X |
| 2,432,887 | 12/1947 | Haviland | 210—532X |

FOREIGN PATENTS

| | | | |
|---|---|---|---|
| 548,980 | 1957 | Canada | 210—532 |

JACOB SHAPIRO, Primary Examiner

U.S. Cl. X.R.

98—33, 34; 210—532; 417—334